(12) United States Patent
Garcés Rivera et al.

(10) Patent No.: US 8,310,214 B2
(45) Date of Patent: Nov. 13, 2012

(54) SYSTEM AND METHOD FOR CONTROL OF MULTIPHASE POWER CONVERTERS

(75) Inventors: Luis José Garcés Rivera, Niskayuna, NY (US); Ruediger Soeren Kusch, Clifton Park, NY (US); Chunchun Xu, Boones Mill, VA (US)

(73) Assignee: General Electric Company, Niskayuna, NY (US)

( * ) Notice: Subject to any disclaimer, the term of this patent is extended or adjusted under 35 U.S.C. 154(b) by 208 days.

(21) Appl. No.: 12/824,544

(22) Filed: Jun. 28, 2010

(65) Prior Publication Data

US 2011/0317460 A1 Dec. 29, 2011

(51) Int. Cl.
*G05F 1/70* (2006.01)
*H02M 7/5387* (2007.01)
(52) U.S. Cl. .......................................... 323/207; 363/98
(58) Field of Classification Search ................ 363/2, 97, 363/98, 131, 132; 323/205, 207, 212, 215
See application file for complete search history.

(56) References Cited

U.S. PATENT DOCUMENTS

| | | | |
|---|---|---|---|
| 6,239,997 B1 * | 5/2001 | Deng | 363/95 |
| 6,856,526 B2 | 2/2005 | Elek et al. | |
| 7,016,793 B2 * | 3/2006 | Ye et al. | 702/60 |
| 7,177,165 B2 * | 2/2007 | Deng et al. | 363/40 |
| 7,183,667 B2 * | 2/2007 | Colby et al. | 307/19 |
| 7,514,913 B2 | 4/2009 | Zhang et al. | |
| 7,778,052 B2 * | 8/2010 | Serpa et al. | 363/40 |
| 8,068,352 B2 * | 11/2011 | Yu et al. | 363/17 |
| 2006/0186855 A1 | 8/2006 | Marroni et al. | |

FOREIGN PATENT DOCUMENTS

WO 2004027959 A1 4/2004

* cited by examiner

*Primary Examiner* — Gary L Laxton
(74) *Attorney, Agent, or Firm* — Ann M. Agosti

(57) ABSTRACT

A control system for controlling a multiphase power converter includes a current control module, a voltage control module and a current command selector. The current control module generates grid voltage command signals for the multiphase power converter and the voltage control module generates reference converter current command signals for the current control module. The current command selector supplies active and reactive current command signals from a supervisory controller to the current control module when the multiphase power converter is connected to the grid and supplies the reference converter current command signals to the current control module when the multiphase power converter is unconnected to the grid.

13 Claims, 6 Drawing Sheets

US 8,310,214 B2

SYSTEM AND METHOD FOR CONTROL OF MULTIPHASE POWER CONVERTERS

BACKGROUND

This invention relates generally to electrical energy conversion and, more specifically, to control of multiphase power converters used for electrical energy conversion.

With the rising cost and scarcity of conventional energy sources and concerns about the environment, there is a significant interest in alternative energy sources such as solar power generation systems, fuel cells, wind turbines, and marine hydro kinetic devices. Most of these alternative energy sources utilize three phase pulse width modulated (PWM) converters to transmit electricity to a power grid.

Three-phase PWM converters connected to the power grid are typically regulated in a current control mode wherein controllers use voltages and currents of the power grid and phase locked loop (PLL) circuits to obtain control signals to provide the phase and the frequency for the currents to be injected into the grid. However, if the grid is not available, as is the case when an alternative energy source is operating in an island mode, the converters are forced to leave the current control mode and switch to a voltage control mode wherein the frequency and phase of the voltage is generated internally. In such cases, the controllers generally include current limiters at their outputs to limit the output currents and are designed to have enough bandwidth to generate balanced voltages under operating conditions with unbalanced loads. The design and tuning of these limiters is rather cumbersome due to the non-linear nature of the limiters and due to the variable nature of the loads.

Further, these converters are connected to the grid or loads through transformers in such a manner that the controllers are designed to provide control signals in a manner to avoid operating modes that could bring the cores of these transformers into saturation. Another challenge is that it is not easy to execute a smooth transition from current control to voltage control when the grid is not available or from voltage control back to current control when the grid becomes available again.

Therefore, it is desirable to provide a method and a system that will address the foregoing issues.

BRIEF DESCRIPTION

In accordance with an embodiment of the present invention, a control system for controlling a multiphase power converter. The control system includes a current control module for generating grid voltage command signals for the multiphase power converter and a voltage control module for generating reference converter current command signals for the current control module. The control system also includes a current command selector for supplying active and reactive current command signals from a supervisory controller to the current control module when the multiphase power converter is connected to the grid and for supplying the reference converter current command signals to the current control module when the multiphase power converter is unconnected to the grid.

In accordance with another embodiment of the present invention, a method for controlling a multiphase power converter is provided. The method includes continuously using voltage feedback signals for generating reference converter current command signals and, when the multiphase power converter is connected to a grid, using active and reactive current command signals from a supervisory for generating converter switching signals. When the multiphase power converter is not connected to any grid, the method uses the reference converter current command signals for generating the converter switching signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
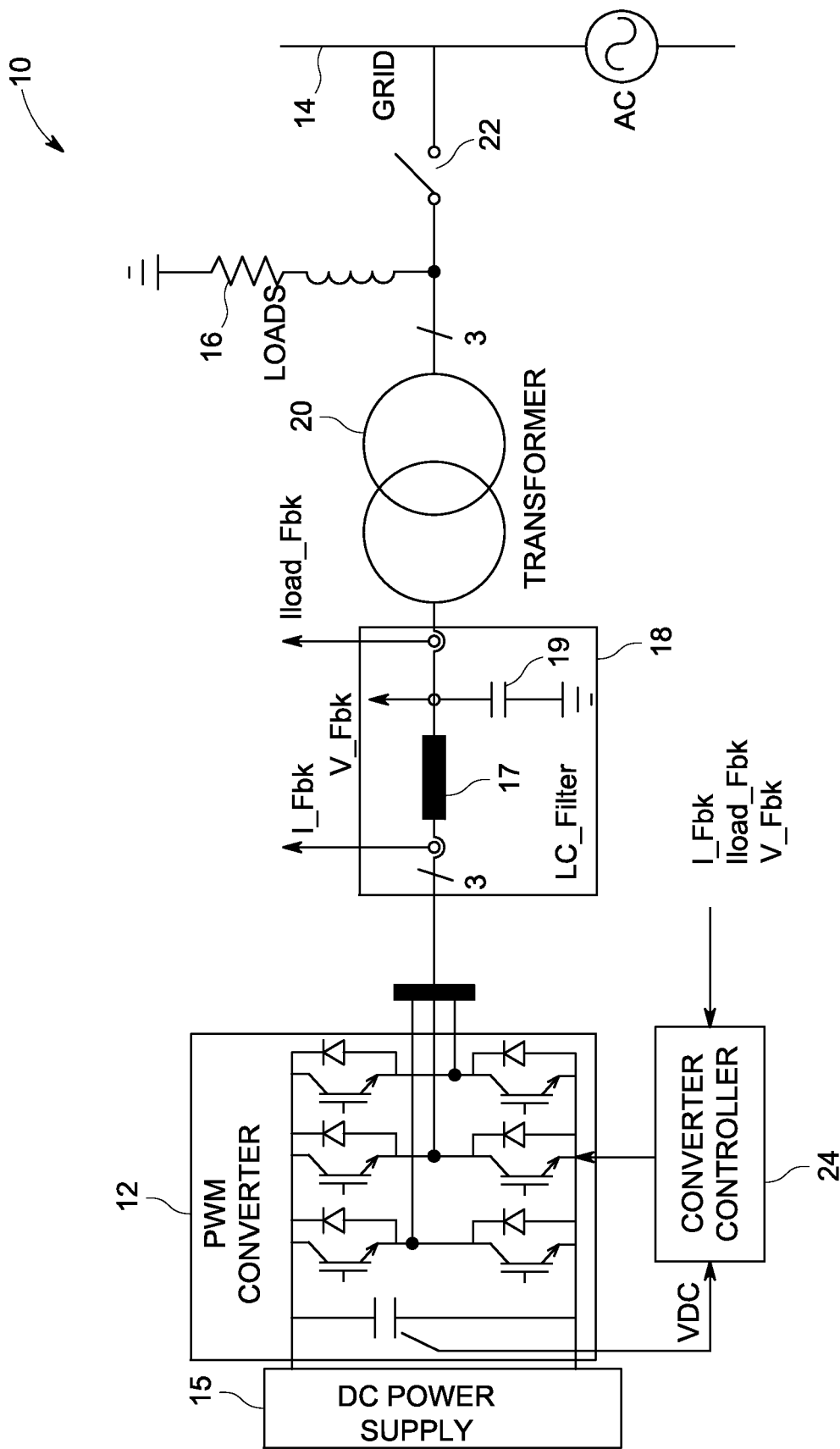
FIG. 1 is a diagrammatical representation of a PWM converter connected to the grid.

FIG. 1 illustrates a schematic 10 of a PWM converter 12 connected to a power grid 14. PWM converter 12 converts input DC power into AC power and transmits the AC power through a low pass filter 18 and a transformer 20 to power grid 14 and to a load 16. The low pass filter may include an inductor 17 and a capacitor 19, for example. A DC power supply 15 is coupled to PWM converter 12. In one embodiment, DC power supply 15 comprises an energy storage device such as a battery. In another embodiment, DC power supply 15 comprises one or more fuel cells or photovoltaic (PV) cells. In yet another embodiment, DC power supply 15 comprises a wind turbine or marine kinetic energy device with an AC to DC converter.

A circuit breaker 22 may be used to isolate PWM converter 12 from grid 14 during abnormal conditions such as faults. A grid condition monitor (not shown) initiates a trip action at circuit breaker 22 in response these abnormal conditions. Load 16 may be inductive, resistive, capacitive or combinations thereof. A converter controller 24 provides appropriate commands to converter 12 to control its output voltage and current.

Figure 2:
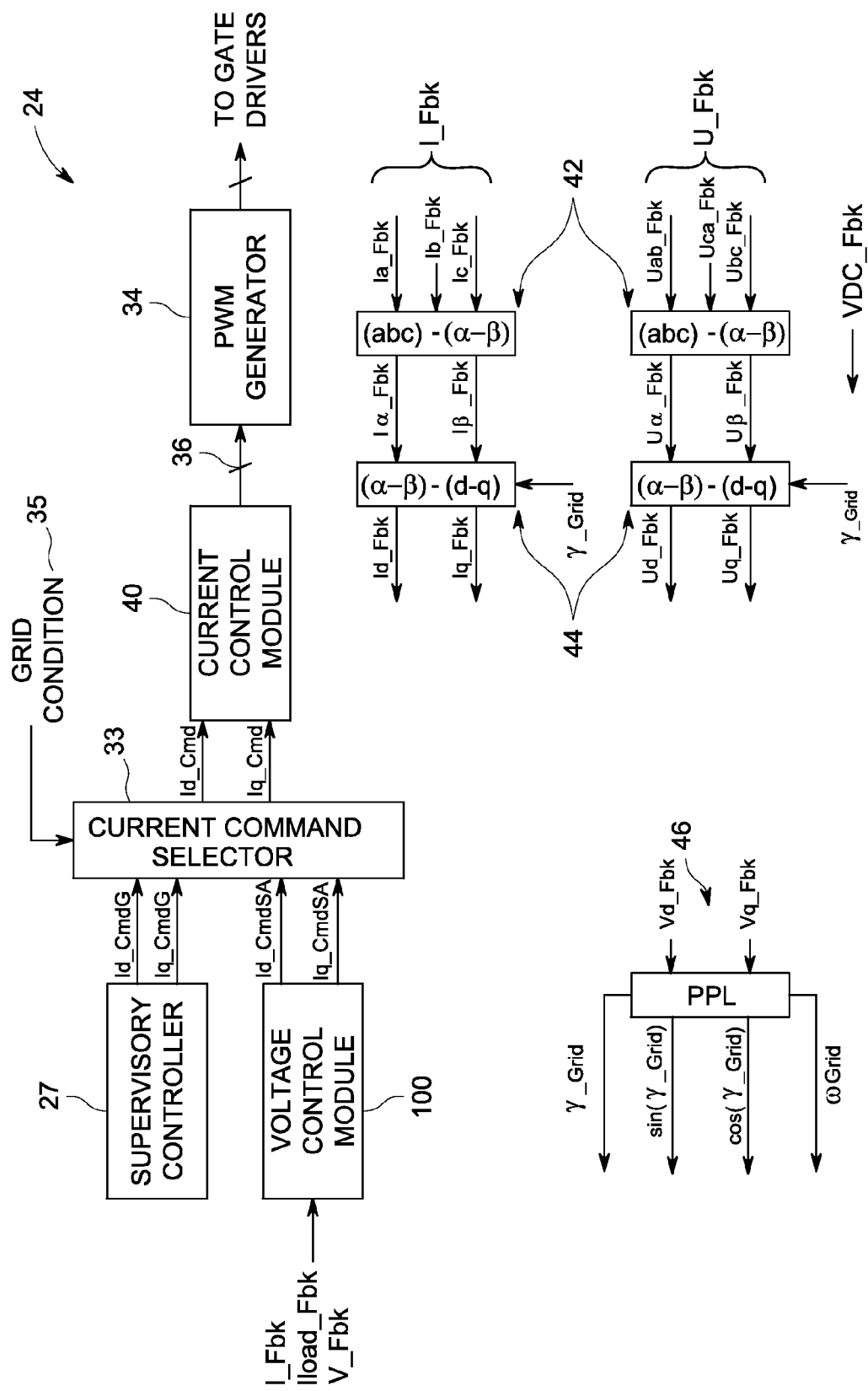
FIG. 2 is a diagrammatical representation of a converter controller for controlling the PWM converter of FIG. 1 in accordance with an embodiment of the present invention.

FIG. 2 illustrates a converter controller 24 for use in the embodiment of FIG. 1 in accordance with an embodiment of the present invention. Converter controller 24 includes a supervisory controller 27 and a voltage control module 100. Supervisory controller 27 provides d-q domain active and reactive current commands Id_CmdG and Iq_CmdG to a current command selector block 33. In one embodiment, supervisory controller 27 generates active and reactive current commands based on active and reactive power commands set by a user, estimated by an algorithm based on grid conditions, or based on the conditions of the DC power supply 15 (shown in FIG. 1). Voltage control module 100 receives three phase converter current feedback signals I_Fbk (Ia_Fbk, Ib_Fbk, Ic_Fbk), load current signals Iload_Fbk, and line voltage feedback signals V_Fbk (Vab_Fbk, Vbc_Fbk, Vca_Fbk) and provides d-q domain reference converter current command signals Id_CmdSA and Iq_CmdSA to current command selector block 33. It should be noted that I_Fbk, Iload_Fbk and V_Fbk are three phase a-b-c domain signals, which may further be converted into d-q domain signals. Converter current feedback signals I_Fbk represent the output current of converter 12, and voltage feedback signals V_Fbk represent the voltage across filter capacitors 19 of FIG. 1. Further, load current signals Iload_Fbk can be measured directly or can be determined by subtracting filter current signals (not shown) from the converter current feedback signals I_Fbk. In one embodiment, filter current signals are calculated from a filter impedance model.

For the grid connected case, it is necessary for current injected in grid 14 (FIG. 1) by converter 12 to have the same phase and frequency as that of grid 14. In one embodiment, three phase voltage feedback signals V_Fbk are utilized to generate phase and frequency of the voltage to be injected in grid 14 by converter 12. In a more specific embodiment, three phase current feedback signals Ia_Fbk, Ib_Fbk, Ic_Fbk and line voltage signals Vab_Fbk, Vbc_Fbk and Vca_Fbk are first transformed into the α-β-o domain i.e., Iα_Fbk, Iβ_Fbk, Io_Fbk, Vα_Fbk and Vβ_Fbk, Vo_Fbk from the a-b-c domain using a Clarke's transformation matrix 42 as given below:

$$\sqrt{\frac{2}{3}}\begin{bmatrix} \frac{1}{\sqrt{2}} & 1 & 0 \\ \frac{1}{\sqrt{2}} & -\frac{1}{2} & \frac{\sqrt{3}}{2} \\ \frac{1}{\sqrt{2}} & -\frac{1}{2} & -\frac{\sqrt{3}}{2} \end{bmatrix}$$

The α-β-0 quantities are then further transformed into d-q-0 quantities Id_Fbk, Iq_Fbk, I0_Fbk Vd_Fbk, Vq_Fbk, V0_Fbk using a Park's transformation matrix 44 as given below:

$$\frac{2}{3}\begin{bmatrix} \cos\gamma_{Grid} & \cos\left(\gamma_{Grid} - \frac{2\pi}{3}\right) & \cos\left(\gamma_{Grid} + \frac{2\pi}{3}\right) \\ \sin\gamma_{Grid} & \sin\left(\gamma_{Grid} - \frac{2\pi}{3}\right) & \sin\left(\gamma_{Grid} + \frac{2\pi}{3}\right) \\ \frac{1}{2} & \frac{1}{2} & \frac{1}{2} \end{bmatrix}$$

It should be noted that since the system is a three wire system, zero sequence components I0_Fbk and V0_Fbk in voltages and currents can be eliminated from the computation.

In the above equation $\gamma_{Grid}$ is a phase angle of the grid voltage feedback signals which may be obtained from a phase locked loop (PLL) 46. PLL 46 may also be used to determine the frequency $\omega_{Grid}$ of the grid voltage feedback signals. The PLL circuit compares the phase of the input signal with a phase signal derived from its output oscillator signal and adjusts the frequency of its oscillator to keep the phases matched.

In one embodiment, current limiters (not shown) limit current signal inputs from supervisory controller 27 and voltage control module 100 before these inputs are supplied to a current command selector 33. Current command selector 33 further receives a grid condition signal 35. Grid condition signal 35 may be provided by a separated anti-island algorithm or an additional sensor (not shown). One example of an anti-island algorithm for detection of disconnection of a grid is disclosed in commonly assigned U.S. Pat. No. 7,016,793, for example. Based on grid condition signal 35, current command selector 33 selects the appropriate current signals Id_Cmd and Iq_Cmd to provide to current control module 40. If grid condition signal 35 indicates that grid is connected to PWM converter 12 (FIG. 1), then current command selector 33 provides supervisory controller output signals Id_CmdG and Iq_CmdG to current control module 40. If grid condition signal 35 indicates that the grid is not connected to PWM converter 12, then the current command selector 33 provides voltage control module output signals Id_CmdSA and Iq_CmdSA to current control module 40. Current control module 40 outputs grid voltage command signals 36 which are then utilized by a PWM generator block 34 to generate switching pulses for switching devices of PWM converter 12 (FIG. 1). PWM generator block 34 may comprise a sine-triangle PWM algorithm, a space vector modulation algorithm, or a PWM algorithm that optimizes the outputs to eliminate low frequency harmonics, for example.

Figure 3:
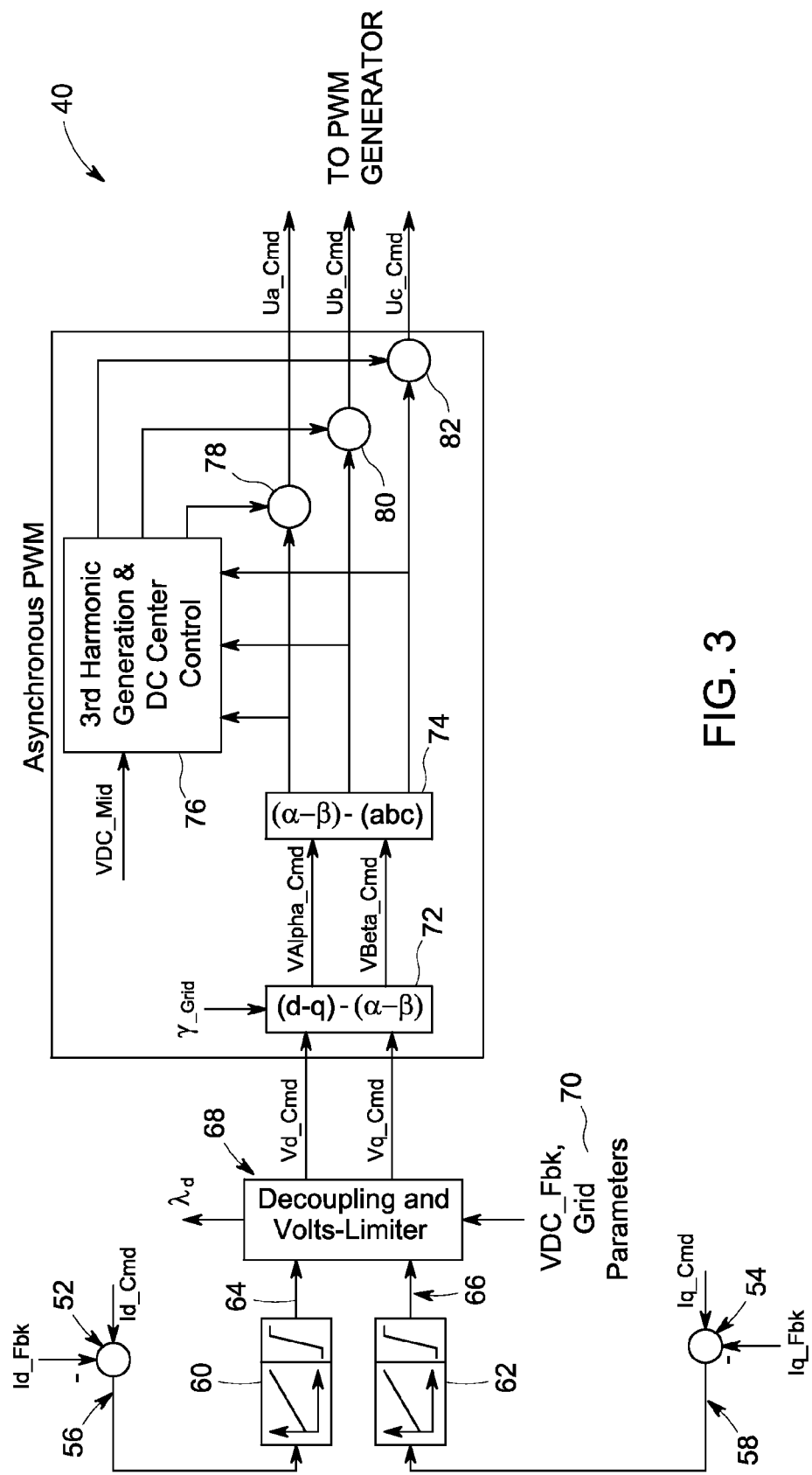
FIG. 3 is a diagrammatical representation of a detailed current control module in accordance with an embodiment of the present invention.

FIG. 3 illustrates a detailed current control module 40 of FIG. 2. Current control module 40 provides appropriate commands Ua_Cmd, Ub_Cmd, and Uc_Cmd to PWM generator 34 (FIG. 2) to control output voltage and current of converter 12 (FIG. 1). Current control module 40 receives d-q domain current command signals Id_Cmd, Iq_Cmd from current command selector 33 (FIG. 2). As described, when grid is connected to converter 12 (FIG. 1), current command signals Iq_Cmd and Id_Cmd are active and reactive current commands. Active and reactive current commands refer to desired currents that should be generated by converter 12 so that the desired amount of active and reactive power is supplied by converter 12 to grid 14. When the grid is not connected to power converter 12, the current signals Id_Cmd and Iq_Cmd are reference converter current signals that refer to desired output voltage that should be generated by converter 12 independently of the type of load being connected.

d-q components Id_Fbk, Iq_Fbk of the current feedback signals I_Fbk are subtracted from current command signals Id_Cmd, Iq_Cmd by algebraic blocks 52, 54. Error signals 56, 58 from algebraic blocks 52, 54 are then supplied to current regulators 60, 62 to provide d-q voltage commands 64, 66 for use in controlling voltages to be injected into grid 14 by converter 12. However, cross coupling between d-q quantities can affect the dynamic performance of current regulators 60, 62. As will be appreciated by those skilled in the art, a decoupling block and voltage limiting block 68 may be utilized to generate decoupled d-q voltage commands Vd_Cmd, Vq_Cmd. Decoupling and voltage limiter block 68, in one embodiment, also receives the DC link voltage VDC_Fbk as input 70 to make these commands independent (within limits) of the amplitude of the output voltage of DC power supply 15. Decoupled d-q voltage commands Vd_Cmd, Vq_Cmd are then transformed into α-β voltage commands Vα_Cmd and Vβ_Cmd using an inverse Park's transformation matrix 72 and then are transformed into a-b-c voltage commands Va_Cmd, Vb_Cmd, Vc_Cmd using an inverse Clarke's transformation matrix 74. A third harmonic generation and DC center controller 76 may further modify the a-b-c voltage commands to maximize the linearity of the commands and generate grid voltage commands Ua_Cmd, Ub_Cmd and Uc_Cmd through algebraic blocks 78, 80, 82. For the case where the power converter 12 is a three level converter, third harmonic generation and DC center controller 76 also receives a mid DC link voltage VDC_Mid as input to balance the upper and lower part of the DC bus voltage. Final voltage commands Ua_Cmd, Ub_Cmd and Uc_Cmd are then utilized by a PWM generator (not shown) to generate gate signals Ma_Cmd, Mb_Cmd and Mc_Cmd for converter switching devices.

Figure 4:
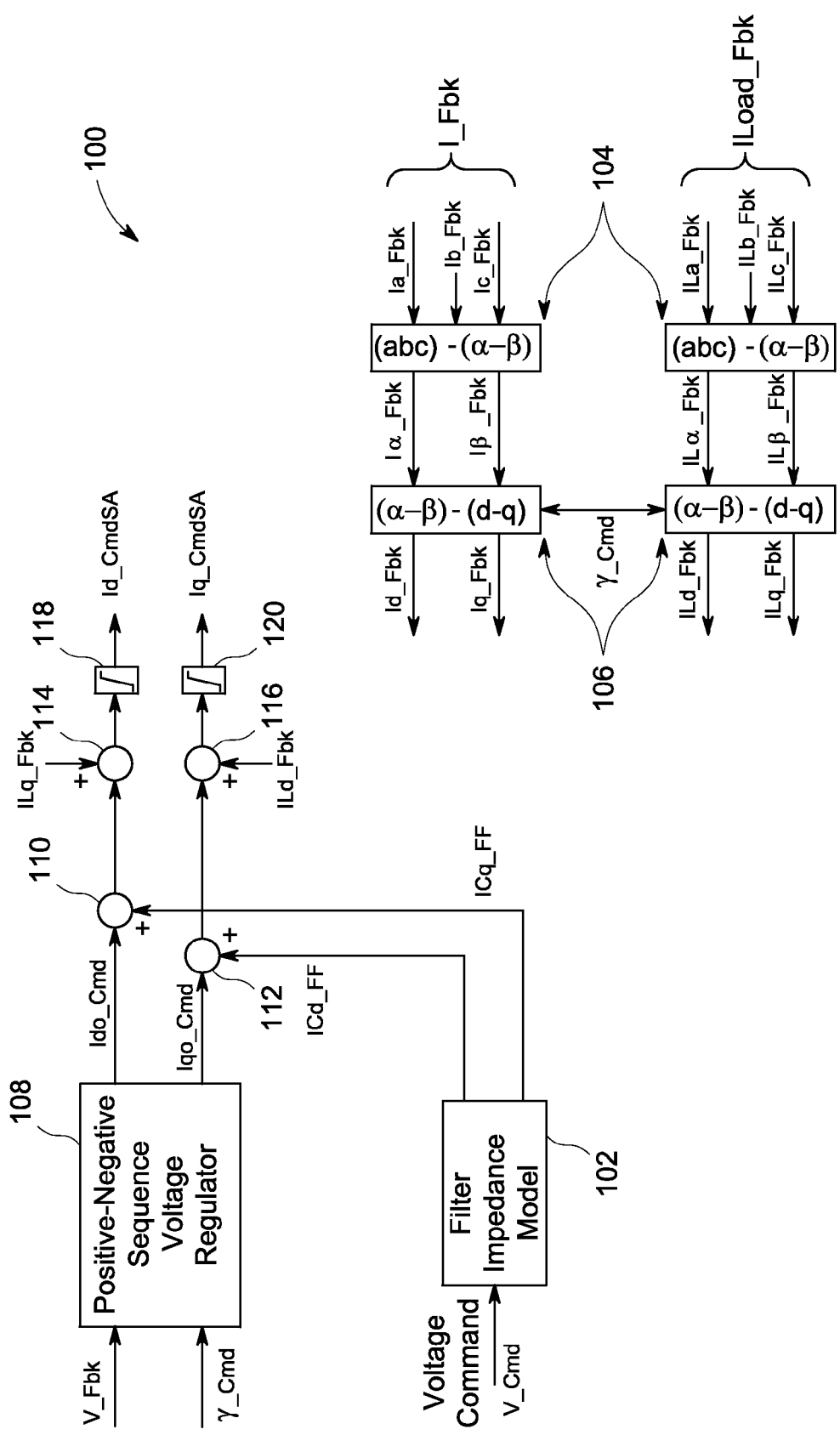
FIG. 4 is a diagrammatical representation of a voltage control module, in accordance with an embodiment of the present invention.

FIG. 4 illustrates a voltage control module 100 of FIG. 2 in accordance with an embodiment of the present invention. During island operation i.e. when grid 14 (FIG. 1) is not available and converter 12 supplies current only to load 16, current command selector 33 (FIG. 2) utilizes output signals of voltage control module 100 to generate current command signals for current control module 40 (FIG. 2). In islanded operation, the desired output voltage of converter 12, Vcmd, is a pure three phase sine wave at each phase at the desired amplitude and frequency. Voltage control module 100 receives input signals such as load current feedback signals Iload_Fbk (ILa_Fbk, ILb_Fbk, ILc_Fbk), converter current feedback signals I_Fbk (Ia_Fbk, Ib_Fbk, Ic_Fbk) and voltage feedback signals V_Fbk. As discussed earlier voltage feedback V_Fbk may be measured from filter capacitors 19, and load current feedback signals may be measured or calculated by subtracting filter current signals from converter current signals I_Fbk. Filter current signals are typically not directly measured but may be calculated through a Filter Impedance model 102 (as discussed below), and converter current feedback signals I_Fbk may be measured at filter input terminals. Converter current feedback signals Ia_Fbk, Ib_Fbk, Ic_Fbk and load current feedback signals ILa_Fbk, ILb_Fbk, ILc_Fbk are converted into d-q domain through a Clark's transformation matrix 104 and a Park's transformation matrix 106. The Park's transformation matrix 106 uses phase or angle information γ_cmd of reference voltage command V_cmd, which may be provided by a separated oscillator (not shown) of the PLL.

Filter impedance model 102 receives a reference voltage command signal V_cmd as an input and outputs filter current signals in the d-q domain i.e., ICd_FF and ICq_FF. Reference voltage command signal V_cmd includes three phase a-b-c domain reference voltage signals which are then transformed into d-q domain reference voltage signals (not shown). In one embodiment, filter current signals ICd_FF, ICq_FF are computed by taking derivatives of commanded voltage V_cmd scaled by the capacitor value C. The use of the calculated and not the measured capacitor current makes the system stable and thus eliminates a possible unstable positive feedback loop caused by the use of the load feedback current. In one embodiment, to correct dynamic or steady state errors in the capacitor current calculations, d-q domain sequence current commands Ido_Cmd, Iqo_Cmd from a positive-negative sequence voltage regulator 108 (which is discussed below with respect to FIG. 5) are added to filter current signals ICd_FF, ICq_FF by addition blocks 110 and 112. d-q domain load current commands ILd_Fbk, ILq_Fbk are then further added to the addition of d-q domain current commands from positive negative sequence voltage regulator 108 and filter impedance model 102 by addition blocks 114, 116. It should be noted here that positive-negative sequence voltage regulator 108 is an optional regulator that is useful if negative sequence components are to be eliminated or, in other words, to ensure a good dynamic behavior when the load is not balanced or when the load is changing very fast. Thus, in one embodiment, d-q domain load current commands may be directly added to output current commands from filter impedance model 102 to generate the converter current commands. In another embodiment, d-q domain load current commands may directly be used as d-q domain current commands. Two current limiting blocks 118, 120 limit these d-q domain current commands and generate reference converter current commands Id_CmdSA and Iq_CmdSA and provide it to current command selector 33 (shown in FIG. 2). To provide a smooth transition between grid connected and grid disconnected operational modes, in one embodiment, the voltage control module is always running regardless of whether the grid is connected. Moreover, the frequency generator used during stand alone operation is the same used as part of the PLL generating the phase angle when in grid connected mode. This insures that no phase jump occurs during the transitions.

Figure 5:
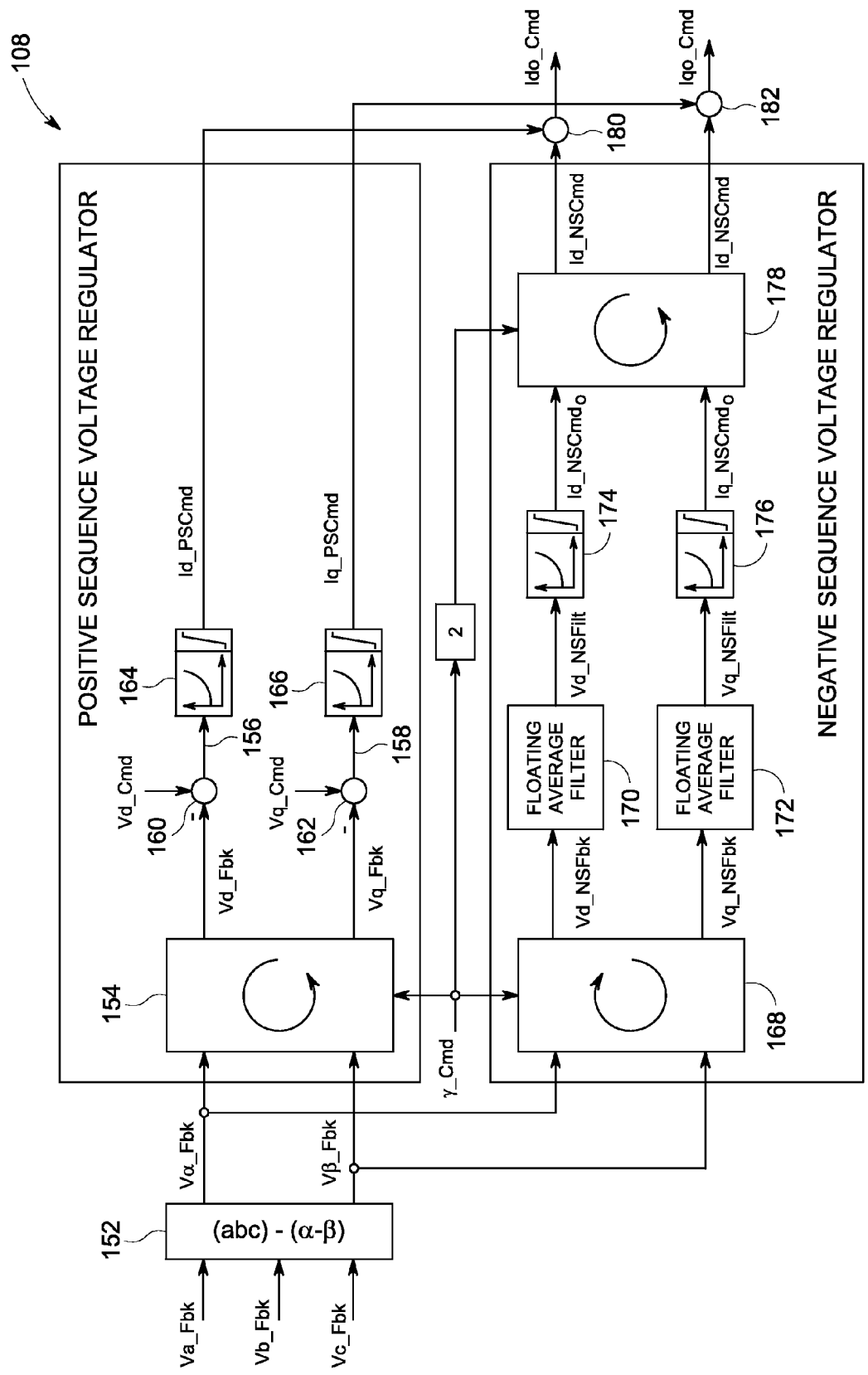
FIG. 5 is a block diagram of a positive-negative sequence voltage regulator of the voltage control module illustrated in FIG. 3, in accordance with an embodiment of the present invention.

FIG. 5 is a positive-negative sequence voltage regulator 108 of the converter voltage controller 100 illustrated in FIG. 4. Feedback voltage signals Va_Fbk, Vb_Fbk and Vc_Fbk measured at the capacitor terminals are converted into two 90° phase shifted components or α-β components Vα_Fbk, Vβ_Fbk using a Clarke's transformation matrix 152. The resultant signals are then rotated forward with the angle γ_cmd of the reference voltage command into a d-q synchronous 2-axis reference frame using a Park's transformation matrix 154. The resultant dq voltage components Vd_Fbk and Vq_Fbk are DC quantities in steady state and are referred to as positive sequence voltages. When the angle γ_Cmd of the commanded voltages used in the Parks' transformation matrix 154 is same as angle of the feedback voltages (that is, when the commanded and actual voltages have same angle) then the values for both positive sequence voltages Vd_Fbk and Vq_Fbk are known. In such a case, one of the voltage components (either Vd_Fbk or Vq_Fbk) is zero, and other is equal to the desired or commanded fundamental voltage amplitude. For example, if the angle γ_Cmd is oriented such that a total voltage vector is in a d-axis, then Vd_Cmd is equal to the amplitude of the output line to neutral voltage, and Vq_Cmd is zero. Comparison blocks 160 and 162 are used to obtain error signals 156, 158 by subtracting the feedback d-q voltage measurements Vd_Fbk and Vq_Fbk from the commanded voltages Vd_cmd and Vq_cmd. The error signals are then fed into positive sequence voltage regulation elements 164, 166. Output signals of positive sequence voltage regulation elements 164, 166 have been limited to the adequate maximum and represent the desired positive sequence current commands Id_PScmd and Iq_PScmd that should flow through the filter to obtain the desired balanced output voltages.

In the embodiment of FIG. 5, a transformation matrix 168 is used to rotate the α-β voltage components Vα_Fbk, Vβ_Fbk backward with the phase angle γ_cmd. The rotation results into conversion of the α-β voltage components into two d-q domain negative voltage components Vd_NSFbk and Vq_NSFbk at twice the applied frequency of the voltage. Average values of these two components Vd_NSFbk and Vq_NSFbk represent the amplitude of the "negative sequence" voltages and are an indication of the presence of voltage imbalance at the converter output. In one embodiment, to better isolate the negative sequence voltage component from these two high frequency components Vd_NSFbk and Vq_NSFbk, low pass filters 170, 172 are used. It should be noted here that the high frequency refers to twice the frequency (2f) of the desired voltage. In another embodiment, low pass filters 170 and 172 may comprise discrete "Floating average" filters. Discrete "Floating average" filters provide better filtering of the negative components by calculating the average of the sum of the last of samples stored during a time equal to the period of the frequency that should be eliminated (that is 2f).

Since the expected output voltage of the converter during islanded operation is a balanced set of three phase voltages, the desired value for both negative sequence components or filtered negative sequence voltage signals Vd_NSFilt and Vq_NSFilt should always be zero. To ensure this condition, both negative sequence voltage components Vd_NSFilt and Vq_NSFilt are fed to negative sequence voltage regulation elements 174 and 176 to generate d-q domain negative current components. After making sure that negative sequence regulation element outputs or d-q domain negative current components Id_NScmd$_0$ and Iq_NScmd$_0$ are within limits, these output signals are transformed forward with twice the angle (2γ_cmd) using a transformation block 178. The transformation results in bringing the negative sequence regulation element output signals to the same reference frame as the output signals of the positive sequence regulators Id_PScmd and Iq_PScmd. Finally, d and q components Id_NScmd and Iq_NScmd of negative sequence current commands from transformation matrix 178 are added to d and q components Id_PScmd and Iq_PScmd from regulation elements 164, 166 using addition blocks 180, 182 to generate final current commands Ido_Cmd and Iqo_Cmd.

Figure 6:
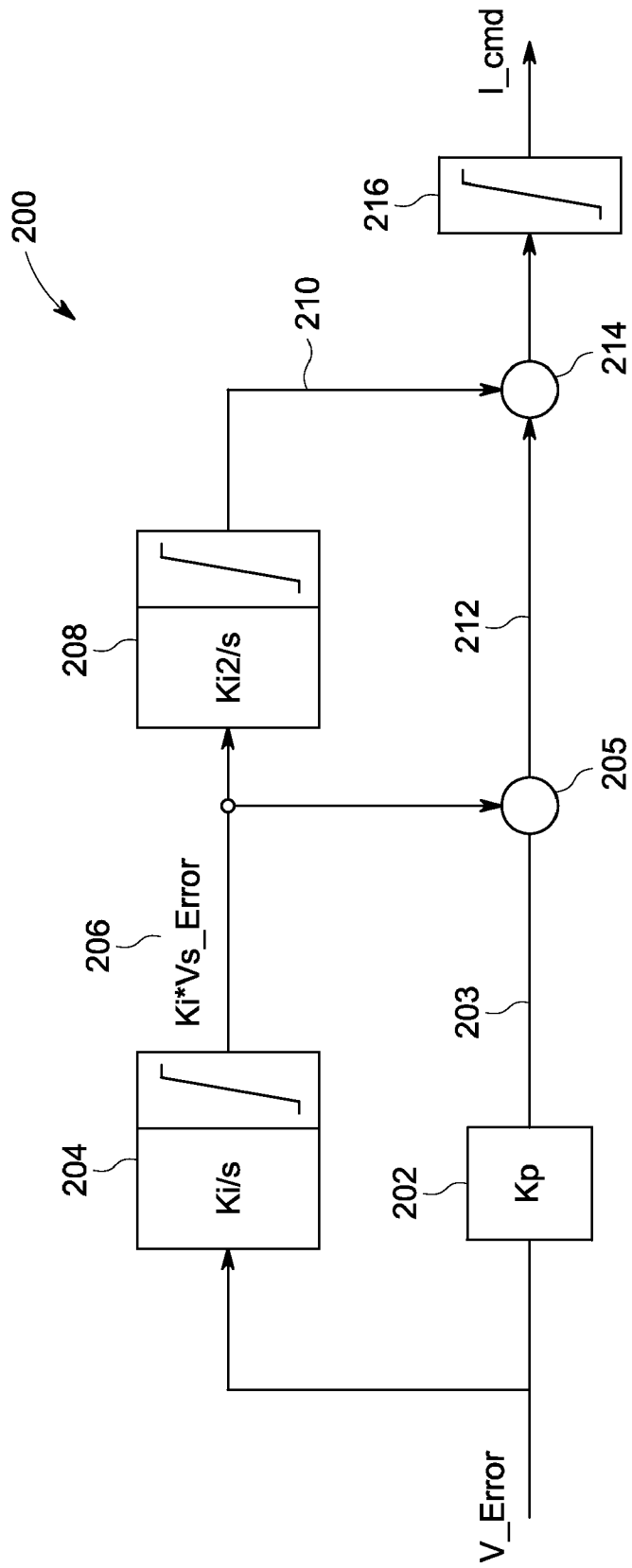
FIG. 6 is a voltage regulator with a dual integrator in accordance with an embodiment of the present invention.

FIG. 6 illustrates an example voltage regulation element 200 with a dual integrator in accordance with one embodiment of the present invention which may be used for one or more of the voltage regulation elements 164, 166, 174 and 176 discussed with respect to FIG. 5. Voltage regulation elements determine appropriate current command signals for a given voltage command signal. Voltage regulation elements 200 includes a proportional block 202 and an integrator block 204 (PI regulator) designed to drive a voltage error V_Error towards zero during steady state conditions. However, during transient conditions, voltages, frequencies, and, current commands may lead to saturation of the magnetic core of transformers 20 (FIG. 2) connected to the loads 16 (FIG. 2). To avoid this condition, the PI regulator is designed to ensure not only that the voltage error is driven towards zero in steady state but also that the volt-seconds or the representative of the flux in the magnetic core is not out of bounds.

In voltage regulation element 200, output signal 206 of first integrator block 204 represents the integral of the error in the voltages or the error in the applied Volt-seconds. To nullify this error in steady state, a second integrator block 208 is added to the output of first integrator block 204. In one embodiment, the second integrator 208 comprises a low bandwidth integrator and ensures that the flux in the transformer 20 is kept at its desired level in steady state. First integrator output 206 is added to an output signal 203 of proportional block 202 using a summation block 205 to generate a PI regulator output 212. Second integrator output 210 and PI regulator output 212 are then added using a summation block 214, and a final current command I_cmd is limited using a current limiter block 216. In another embodiment, if the system is to start from a zero voltage condition under voltage control during island condition, the commanded voltages and frequency are ramped together from zero keeping the Volt/Hertz ratio constant until reaching the operating frequency.

One of the advantages of the present control system is that the system ensures a smooth transition between the current and voltage control modes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system for controlling a multiphase power converter, the control system comprising:
   a current control module for generating grid voltage command signals for the multiphase power converter;
   a voltage control module for generating reference converter current command signals for the current control module; and
   a current command selector for supplying active and reactive current command signals from a supervisory controller to the current control module when the multiphase power converter is connected to the grid and for supplying the reference converter current command signals to the current control module when the multiphase power converter is unconnected to the grid.

2. The control system of claim 1, wherein the voltage control module comprises a filter impedance model for determining filter current signals of an LC filter coupled to the multiphase power converter based on reference voltage command signals.

3. The control system of claim 2, wherein the filter impedance model is configured to determine the filter current signals by obtaining derivatives of the reference voltage command signals scaled by a capacitor value of the LC filter.

4. The control system of claim 2 further comprising a voltage regulator for receiving multiphase power converter voltage feedback signals and a phase angle of a reference voltage command and for generating sequence current command signals.

5. The control system claim 4, wherein the multiphase power converter voltage feedback signals are measured at output terminals of the LC filter.

6. The control system of claim 4, wherein the reference current converter command signals are generated by addition of the sequence current command signals, the filter current signals, and load current feedback signals.

7. The control system of claim 4, wherein the voltage regulator comprises a positive sequence voltage regulator for generating positive sequence current commands in the d-q reference frame and a negative sequence voltage regulator for generating negative sequence current command in the d-q reference frame, and wherein the sequence current commands are generated by adding the positive sequence and negative sequence current commands in the d-q reference frame.

8. The control system of claim 7, wherein the positive sequency voltage regulator comprisese two positive sequence voltage regulation elements, each comprising a proportional integral (PI) regulator and a dual integrator.

9. The control system of claim 7, wherein the negative sequence voltage regulator comprises a first transformation matrix to convert voltage feedback signals into d-q domain negative voltage components by rotating forward at twice the grid frequency.

10. The control system of claim 9, wherein the negative sequence voltage regulator comprises low pass filters configured to generate d-q domain negative sequence voltages by filtering the d-q domain negative voltage components.

11. The control system of claim 10, wherein the low pass filters each comprise a floating average filter.

12. The control system of claim 11, wherein the negative sequence voltage regulator comprises negative sequence regulation elements configured to determine d-q domain negative current components from the filtered d-q domain negative sequence voltages.

13. The control system of claim 12, wherein the negative sequence voltage regulator comprises a second transformation matrix to transform d-q domain negative current components into negative sequence current commands.

* * * * *